Aug. 31, 1954 G. R. BLACKMAN ET AL 2,687,909
SEAL RING
Filed Sept. 8, 1950 2 Sheets-Sheet 1
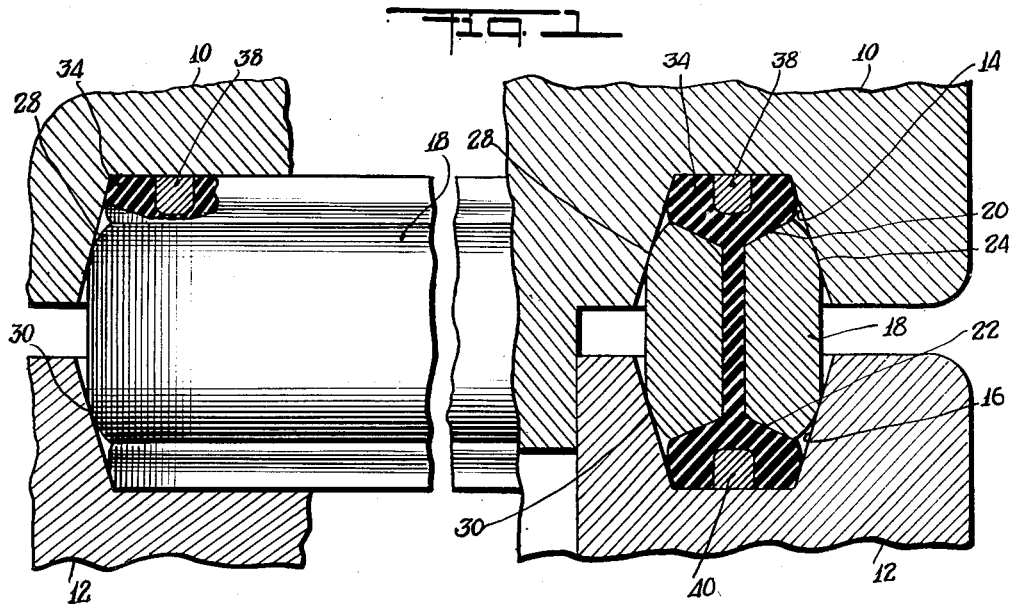
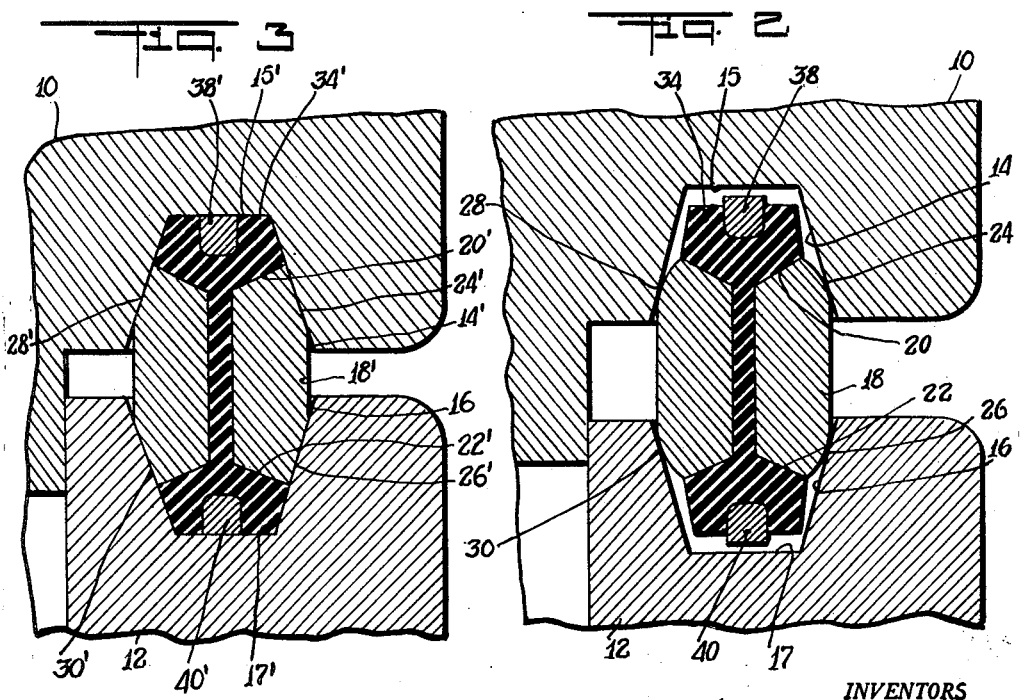
INVENTORS
Glenn R. Blackman
BY Thad L. Putnam
Charles E. Lightfoot
ATTORNEY Aug. 31, 1954   G. R. BLACKMAN ET AL   2,687,909
SEAL RING
Filed Sept. 8, 1950   2 Sheets-Sheet 2

INVENTORS
Glenn R. Blackman
Thad L. Putnam
BY
Charles E. Lightfoot
ATTORNEY

Patented Aug. 31, 1954

2,687,909

UNITED STATES PATENT OFFICE 2,687,909

SEAL RING

Glenn R. Blackman and Thad L. Putnam,
Houston, Tex.

Application September 8, 1950, Serial No. 183,762

4 Claims. (Cl. 288—20)

This invention relates to a sealing ring, and more particularly to a packing or sealing ring structure adapted for use between two parts between which a fluid tight connection must be maintained.

The invention is capable of broad application wherever two members are to form a fluid tight connection, and provides a sealing means which possesses great mechanical strength as well as improved resistance to leakage.

An important object of the invention is to provide a sealing ring constructed to have metal to metal engagement between the parts which are connected and also having resilient means forming a sealing contact with the parts.

A further object of the invention is the provision of a sealing ring structure embodying a metal ring having resilient sealing means incorporated therewith, whereby structural rigidity is imparted to the ring as well as means for enabling the same to conform to the contour of the parts which are connected.

A further object of the invention is to provide a sealing ring having a rigid metallic body portion adapted to seat between the parts which are connected, and a resilient packing portion carried by the body and adapted to be compressed into sealing engagement with parts.

A further object of the invention is the provision of the sealing ring structure having a rigid metallic body or core with which is incorporated a resilient packing material and having means engageable with the parts which are connected, whereby the packing material is compressed between the parts and the core to form a fluid tight seal.

A still further object of the invention is to provide a sealing ring structure of simple design whose structure combines parts having high wear resistance qualities with resilient portions assuring a positive seal between the parts which are connected.

The invention will best be understood from the following detailed description constituting a specification on the same when considered in conjunction with the annexed drawings herein—

Figure 1 is a fragmentary view, partly in cross-section taken along a radius of the sealing ring, showing the invention as applied to adjoining parts between which a fluid tight seal is to be provided;

Figure 2 is a fragmentary cross-sectional view taken along a radius of the ring, showing the ring in position between the parts before the same are moved into sealing engagement with the ring;

Figure 3 is a fragmentary cross-sectional view showing a somewhat modified form of the invention;

Figure 4:
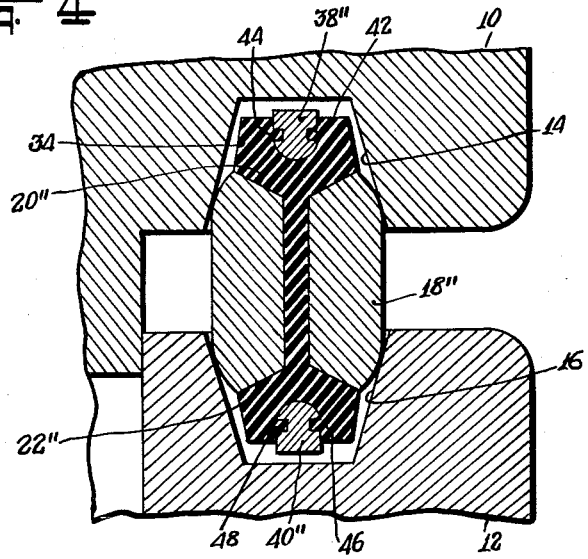
Figure 4 is a fragmentary cross-sectional view similar to that of Figure 2, illustrating another slightly modified form of the invention.

Referring now to the drawings in greater detail, wherein like numerals of reference designate the same parts throughout the several views, the numerals 10 and 12 indicate, respectively, two parts between which a fluid tight seal is to be maintained, such for example as the body and bonnet of a plug valve.

The part 10, which in the present illustration may be the bonnet of a plug valve, may be formed with an annular inwardly tapering groove 14, and the part 12, which may be the body of the valve may likewise be formed with an inwardly tapered annular groove 16 adapted to be positioned opposite the groove 14, when the valve parts are in assembled condition. The grooves 14 and 16 may conveniently be formed with flat bottom portions 15 and 17, respectively. This construction of the parts is conventional and forms no part of the present invention, except insofar as the sealing ring cooperates with the grooves to form a fluid tight seal.

The sealing ring of the invention is made up of a body or core portion 18, preferably of rigid material such as metal, having oppositely disposed inwardly tapering continuous recesses in the shape of grooves 20 and 22, respectively, extending entirely about the ring. In the form of the invention illustrated in Figures 1 and 3, the body portion 18 is rounded on its inner and outer periphery adjacent the recesses 20 and 22, as indicated at 24, 26, 28 and 30 for a purpose later to be made apparent. The body member 18 is also provided with spaced openings 32 extending therethrough from the recess 20 to the recess 22.

The sealing ring has a resilient packing portion 34, preferably of moldable material filling the recesses 20 and 22 and extending outwardly therefrom at opposite sides of the ring, which packing material extends through the openings 32. Embedded within the extending portions of the resilient packing 34 are ring elements 38 and 40. These ring elements preferably extend somewhat beyond the packing material, as best seen in Figure 3 of the drawing.

In the application of the above described sealing ring structure the same may be placed in the groove 16 of the valve body and the bonnet of the valve body 12, and the bonnet 10 placed upon the body, with the ring extending into the groove 14 thereof, as seen in Figure 4. When the bonnet is tightened on the body the groove 14 will then be moved toward the groove 16 bringing the rounded portions of the sealing ring into contact with the tapered walls of the grooves. The extending portions of the packing material are preferably of a length to assure that the ring elements 38 and 40 will engage the bottoms 15 and 17 respectively of the grooves 14 and 16, before the rounded portions of the ring are brought into solid contact with the tapered sides of the grooves, so that the ring elements 38 and 40 will be forced inwardly toward the core of the ring, as shown in Figure 1, deforming the packing material and forcing the same into sealing contact with the sides and bottoms of the grooves.

It will be noted that the rounded portions of the ring contact the tapered walls of the groove forming a metal to metal engagement having great mechanical strength, while at the same time the resilient packing material is forced into sealing engagement with the grooves, thus forming a tight seal and completely protecting the packing material against displacement, while at the same time preventing injury to the packing from contact with deleterious material which might otherwise leak through the seal. In the event that the grooves 14 and 16 do not perfectly match the rounded portions of the body 18 permit the ring to adjust itself to the grooves to form a perfect seal between the parts.

Figure 5:
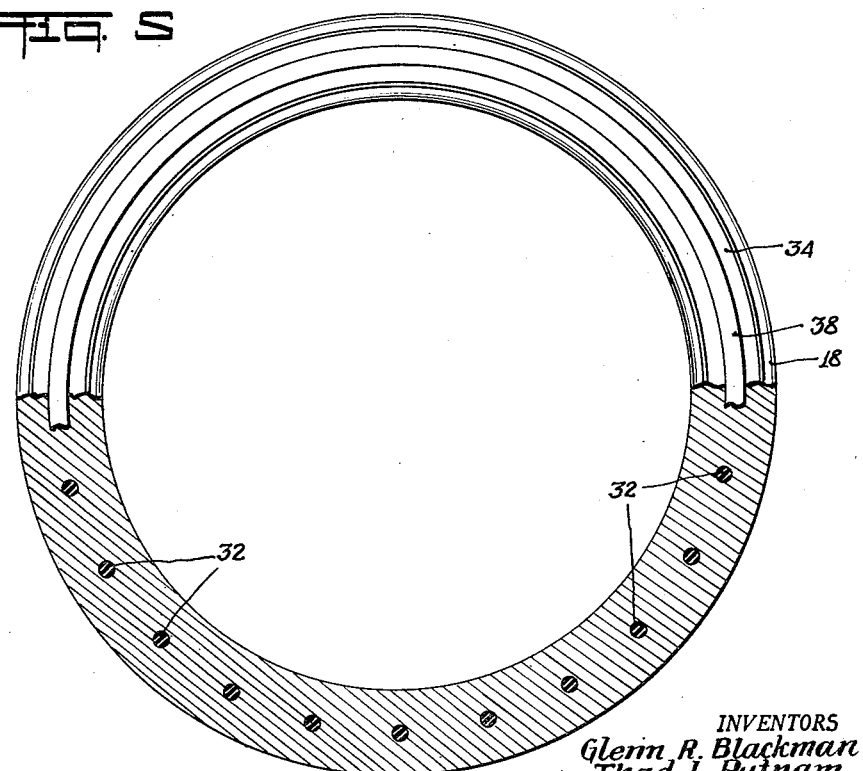
Figure 5 is a plan view, partly broken away and partly in cross-section, showing the sealing ring of the invention separated from the parts with which it cooperates in use.

In the form of the invention shown in Figure 5 the body or core of the ring 18' is formed with recesses 20' and 22' respectively, similar to those previously described and this ring has similar packing material 34' within which similar ring elements 38' and 40' are imbedded. The core 18' is also provided with openings therein similar to the openings 32 previously described, and the packing material extends through these holes. In this form of the invention the inner and outer periphery of the body is formed with tapered surfaces 24', 26', 28' and 30', which engage the tapering walls of the grooves 14 and 16 over relatively large areas, when the ring is in a sealing position, as seen in Figure 4. This form of the invention is used in the same manner as that previously described, the ring elements 38' and 40' engaging the bottoms 15' and 17' of the grooves before the surfaces 24', 26', 28' and 30' are in solid contact with the tapered walls of the grooves.

A further modification of the invention is illustrated in Figure 5, wherein the sealing ring has the same general construction as that illustrated in Figures 1 and 3 except that the ring elements 38'' and 40'' have oppositely disposed grooves 42, 44, 46 and 48 into which the packing material extends, whereby the ring elements are securely retained in the resilient portion 34.

This form of the invention is applied in the same way as that previously described in Figures 1 and 3.

It will thus be seen that the invention as described above provides a sealing ring structure having great mechanical strength as well as resiliency and which is capable of readily conforming to the shape of the parts between which the seal is to be maintained, while at the same time effectively preventing displacement of the sealing material resulting from the exertion of too great a pressure on the same.

The invention has been described in connection with certain specific embodiments, but it will be understood that these are for the purpose of illustration only, and numerous changes can be made in the construction and arrangement of the various parts, within the spirit of the invention and the scope of the appended claims.

What is claimed and desired to secure by Letters Patent is:

1. A sealing member adapted to form a seal between two opposed parts having inwardly facing grooves, said member comprising a rigid body having portions adapted to be engaged with the parts in the grooves, said body having outwardly opening tapering recesses adapted to face the grooves, resilient packing material carried in said recesses and adapted to be engaged with the parts in the grooves and rigid means adapted to extend beyond the resilient material inwardly of the grooves and adapted to engage with said resilient material and the bottoms of the grooves to expand the resilient material so that it is adapted to sealingly contact the parts upon relative movement of the parts toward each other.

2. A sealing member adapted to form a seal between two opposed parts having inwardly facing annular grooves, said member comprising a rigid body having portions adapted to be engaged with the parts in the grooves, said body having outwardly opening annular recesses in said portions adapted to face the bottoms of the grooves and openings connecting the recesses, resilient packing material in the recesses and openings and adapted to extend into the grooves, ring elements adapted to be positioned in the grooves and to extend inwardly thereof beyond said resilient material for engagement with the bottoms of the grooves when the parts are moved into engagement with the body to compress said material into sealing engagement with the parts.

3. A sealing member adapted to form a seal between two opposed parts having inwardly facing tapering grooves, said member comprising a rigid body having portions formed to correspond with the taper of the grooves and adapted to be engaged with the parts in the grooves, said body having tapering recesses adapted to face the grooves and openings connecting the recesses, resilient packing material adapted to be positioned in the recesses and to extend through the openings and adapted to be engaged with the parts in said grooves and rigid means adapted to be positioned in the grooves and to extend inwardly thereof beyond the resilient material for engagement with the bottoms of the grooves to expand said resilient material into sealing contact with the parts.

4. A sealing member adapted to form a seal between two opposed parts having inwardly facing annular grooves, said member comprising a rigid body having portions adapted to be engaged with the parts in the grooves and spaced from the bottoms of the grooves, said body having outwardly opening annular recesses adapted to face the grooves, resilient packing material adapted to be positioned in the recesses and to extend into the grooves, and ring elements embedded in the resilient material and having portions adapted to extend inwardly of the grooves beyond the resilient material for engagement with the bottoms of the grooves, said elements being cooperable with the parts upon movement of the parts into engagement with the body to compress said material into sealing contact with said parts to substantially completely fill the spaces between the body and the bottoms of said grooves.

References Cited in the file of this patent

UNITED STATES PATENTS

| Number | Name | Date |
|---|---|---|
| 323,731 | Phillips | Aug. 4, 1885 |
| 494,402 | Walsh | Mar. 28, 1893 |
| 783,943 | Frost | Feb. 28, 1905 |
| 1,567,813 | Oleson | Dec. 29, 1925 |
| 2,246,600 | Putnam et al. | June 24, 1941 |
| 2,260,542 | Shaffer | Oct. 28, 1941 |
| 2,309,154 | Adaid | Jan. 26, 1943 |
| 2,533,868 | Anderson | Dec. 12, 1950 |

FOREIGN PATENTS

| Number | Country | Date |
|---|---|---|
| 518,397 | Germany | Feb. 14, 1931 |